INVENTORS
RALPH L. YOUNG
KINGSLEY E. HUMBERT, JR.

Aug. 5, 1969 R. L. YOUNG ET AL 3,458,977
FILTERS
Filed May 19, 1964 2 Sheets-Sheet 2

INVENTORS
RALPH L. YOUNG
KINGSLEY E. HUMBERT, JR

United States Patent Office 3,458,977
Patented Aug. 5, 1969

3,458,977
FILTERS
Ralph L. Young and Kingsley E. Humbert, Jr., Gastonia, N.C., assignors to Wix Corporation, Gastonia, N.C., a corporation of North Carolina
Continuation-in-part of application Ser. No. 846,745, Oct. 15, 1959. This application May 19, 1964, Ser. No. 377,157
Int. Cl. B01d 46/02
U.S. Cl. 55—490  3 Claims This invention relates generally to improvements in filters and pertains particularly to a filter structure which is designed primarily as an air filter although it is to be understood that it is not limited to such use.

The present application is a continuation-in-part of copending U.S. patent application Ser. No. 846,745, filed Oct. 15, 1959, now abandoned.

In the employment of air filters and filters for other fluids in automobiles and in other structures or assemblies, it is highly desirable that such structures be as useful of available volume or space as possible. Since this available space is often limited in at least one dimension, a filter structure of relatively thin configuration, but of large area, is required which must fulfill the necessary mechanical stability demands. In other words, a construction having maximum strength to weight ratio is highly desirable and it is accordingly a particular object of the present invention to provide a new and improved filter structure of this type or having such advantages.

It is also an object of the present invention to provide a new type of filter for air and other fluids having in the construction an inherent high strength to weight ratio and designed so that the filtering medium thereof has a high surface area per unit volume.

Another object of the invention is to provide a novel filter structure so designed that the fluid to be filtered is distributed in a number of paths to pass through a corresponding number of membranes or walls defining trapping chambers in which to collect foreign matter entrained in the fluid stream.

Still another object of the invention is to provide in one embodiment thereof a honeycomb type of construction wherein the cells are grouped with respect to intake and outlet apertures so that fluid passing through each intake aperture into a cell will be forced to pass through the wall structure between such cell leading into an adjacent cell which is in communication with an outlet aperture, the cells into which the fluid enters functioning as a trapping compartment for foreign material entrained in the fluid stream.

Another object of the invention is to provide a filter unit for air and other fluids, of honeycomb form or construction wherein adjoining walls of the cells are of double thickness and wherein the fluid flow through the unit is so controlled as to force its passage through the double thick walls between adjacent cells for realizing a maximum filtering action or effect.

Another object of the invention is to provide a filtering unit for air and other fluids wherein the filtering medium is interposed between apertured walls the material of which may or may not be pervious to the fluid and wherein the filtering medium between such walls is shaped or formed in a novel manner to cause the fluid to follow a tortuous path in passing from the inlet openings or apertures of one of the walls to the outlet apertures or openings of the opposite wall.

Still another object of the invention is to provide a filter of the character stated in which the filtering honeycomb material has cells essentially hexagonal in shape and wherein part of the hexagon walls are of double thickness filtering paper glued together along a definite length of the structure.

Still another object of the invention is to provide a filtering unit for air and other fluids wherein the cells of the cellular filtering material are essentially parallelograms, the material being shaped or designed so that contact between the cells is reduced to a line rather than to a flat surface contact as in certain of the honeycomb constructions.

A further object of the invention is to provide a new and novel method of making a filter which greatly facilitates manufacture of the filter and which eliminates a number of expensive and time consuming steps required to make similar filters.

The invention will be best understood from a consideration of the following detailed description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claims.

Figure 1:
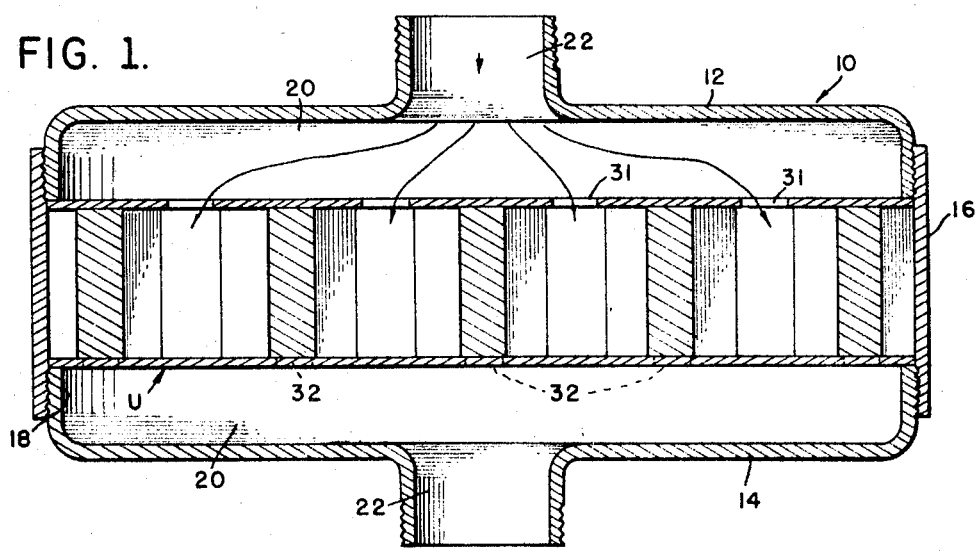
FIG. 1 illustrates in cross section a conventionally formed casing in which the filtering unit constructed in accordance with any one of the hereinafter described embodiments may be enclosed for use, the particular section shown being taken, for the filtering unit along, substantially on the line 1—1 of FIG. 2 in which one honeycomb type of unit is illustrated.

Referring now more particularly to the drawings, there is shown in FIG. 1 a housing which is generally designated 10, in which certain of the illustrated embodiments of the honeycomb filter unit may be encased for use.

It is to be understood that the housing here illustrated is more or less diagrammatic in form and that such form is in no way limiting upon the manner in which the filtering units may be employed or, in other words, the filtering units may be encased for use in any type of housing or casing which is found suitable or to which they may be readily adapted.

In the filtering housing illustrated the numerals 12 and 14 designate opposing sections of the casing which may be circular or rectangular according to the geometrical form of the filter unit to be placed therein, the said opposing sections being illustrated as joined together by an encircling band wall 16. Where the filter casing is of circular form the oppositely located portions 12 and 14 may be threadably engaged in and coupled with the wall 16 and the filtering unit, which is generally designated by the reference character U, may be secured between the opposing edges of the wall flanges 18 whereby there are formed at opposite sides or at the top and bottom of the filtering unit the chambers 20 which communicate with nipples 22 integral with the walls 12 and 14, as shown.

Obviously either of the nipples 22 and of the chambers 20 may form the fluid inflow nipples and chambers or fluid outflow nipples and chambers, since the filtering unit functions the same regardless of which direction the fluid flows in passing therethrough.

Figure 2:
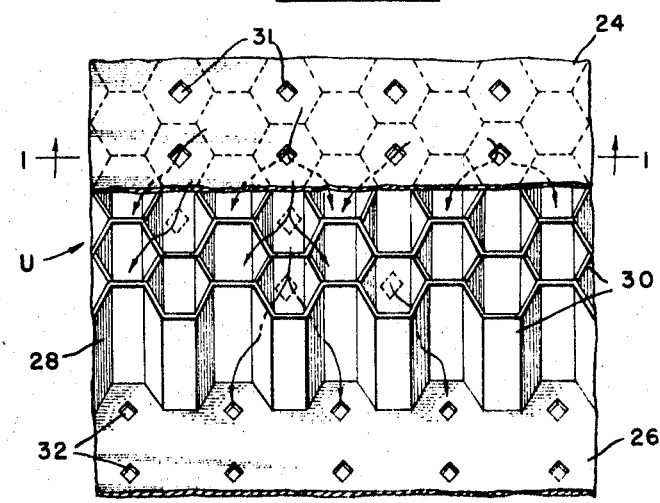
FIG. 2 is a view in perpsective with parts broken away of one embodiment of the honeycomb filter unit form.

The unit U illustrated in FIG. 1 may represent any one of the several embodiments shown, but is directed to the type of honeycomb structure shown in perspective in FIG. 2. Therefore, the reference characters applied to the unit in FIG. 1 and those applied to the structure of FIG. 2 will be the same.

The filter unit structure of FIG. 2 comprises top and bottom sheets of suitable material which are generally designated respectively by the reference characters 24 and 26, maintained in spaced relation by the cellular central structure which is generally designated 28.

The bodies 24 and 26 may be of relatively thick character so as to have a certain degree of rigidity or stiffness and such bodies may be formed of any suitable material which may be air pervious or impervious, as desired.

The cellular honeycomb structure 28 is made up of a suitable filter paper through which the air or other fluid is adapted to pass and this structure comprises horizontal and transverse rows of cells of hexagonal cross sectional form, each of which cells is designated 30. The top and bottom ends of the cells are adhesively secured to the separating sheets 24 and 26.

One of the sheets between which the cells are located is provided with a series of rows of apertures 31 each of which opens into a cell in a corresponding parallel row. The rows of cells into which the openings 31 are directed alternate with rows which are closed at their top ends by the sheet 24 in which the openings 31 are formed and these alternate rows are in communication with apertures 32 formed in the opposite sheet 26, hereinbefore referred to as the bottom sheet.

While the sheets 24 and 26 have been referred to as top and bottom sheets, this is merely an arbitrary designation of the same since it will be obvious that either of the sheets may form the top or the bottom sheet depending upon the direction of flow of liquid through the unit.

The cells 30 of the unit shown in FIG. 2 are illustrated as having all walls of the same thickness. In other words, the cellular structure is formed in a suitable manner as a complete or integral unit.

When the filtering unit is placed in a housing of the character illustrated in FIG. 1, the sheets or walls 24 and 26 will be engaged around the periphery by the edges of the flanged portions 18 so that the unit will be maintained in proper center position in the housing.

Upon the inflow of air or other fluid through the top nipple 22, for example, as indicated by the arrows, the fluid will enter the apertures 31 of the top sheet wall 24 and will pass laterally through dividing walls between the cells into which it enters into adjacent cells to flow outwardly through lower ends of such adjacent cells and pass through the lower apertures 32 into the lower chamber 20 of the housing.

While the housing 10 has been illustrated in a manner which suggests that it is of circular form and the illustration of the honeycomb cell unit of FIG. 2 is rectangular, it will, of course, be understood that this illustration merely represents a portion of the filter unit structure which would be suitably shaped to fit a circular housing or a housing of any other configuration, and this applies also to the showing of the other embodiments of the filtering unit.

Figure 3:
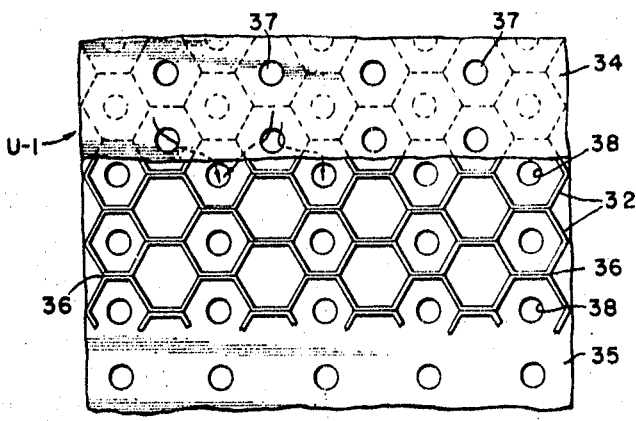
FIG. 3 is a perspective view partly broken away illustrating a modification of the honeycomb construction shown in FIG. 2.

FIG. 3 illustrates another embodiment of the honeycomb filtering structure, the unit here being generally designated U–1. This unit illustrates another way of forming the honeycomb structure where the cells 33 secured between the sheets or walls 34 and 35 are essentially hexagon shaped but where the hexagon walls are of double thicknesses of paper placed together as indicated at 36, along definite lines. In other words, each hexagon cell is made up of strips of filter paper formed to provide a series of joined together, alternately oppositely extending or projecting half hexagons so that when the strips of filter paper so formed are placed in proper side by side relation, the cells will be separated by walls of double thickness which are here shown as extending in lines across the width of the unit and each cell will have four walls of single thickness of filter paper.

The wall or sheet 34 is provided with rows of fluid in the same manner as those illustrated in FIG. 3 whereby municating with rows of cells which alternate with other rows of cells which have outlet openings 38 in the bottom sheet 35 as illustrated.

In this unit construction the abutting cell walls forming the double thickness walls 36, may be glued together or left unglued, as desired.

Figure 4:
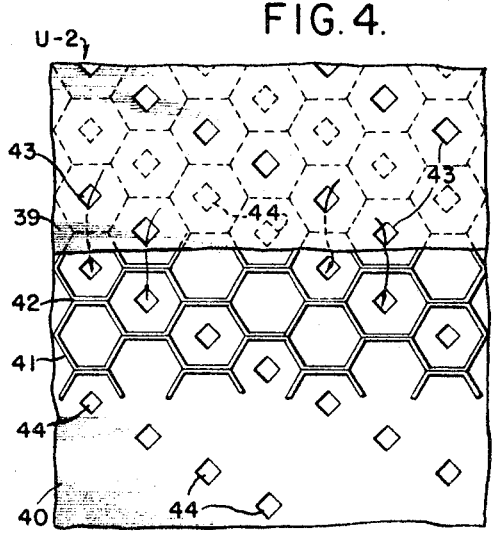
FIG. 4 is a view in perspective with parts broken away showing a honeycomb construction with the double thickness of material between cell walls and illustrating inflow and outflow apertures arranged so as to force passage of fluid through the double thick walls of the cells.

FIG. 4 illustrates another embodiment of the filter structure where a portion of the unit which is generally designated U–2 is shown in top perspective and embodies the spaced walls or sheets 39 and 40 of the honeycomb cells between the spaced walls or sheets are designated 41. In this construction the honeycomb cells are formed in the same manner as those illustrated in FIG. 3 whereby there are provided between the cells of the rows the walls 42 of double thickness. However, in this embodiment the inlet apertures 43 formed in the top wall 39 are in rows directed obliquely across the unit to enter corresponding obliquely arranged rows of the cells 41 which alternate with rows of cells which communicate at their lower ends with outlet apertures 44 in the bottom sheet 40. Thus it will be seen that with this arrangement fluid passing through the apertures 43 into the associated cells will be forced to pass through the parallel single and double thickness walls 41 and 42 in order to enter the cells which communicate with the opposite openings 44.

Figure 5:
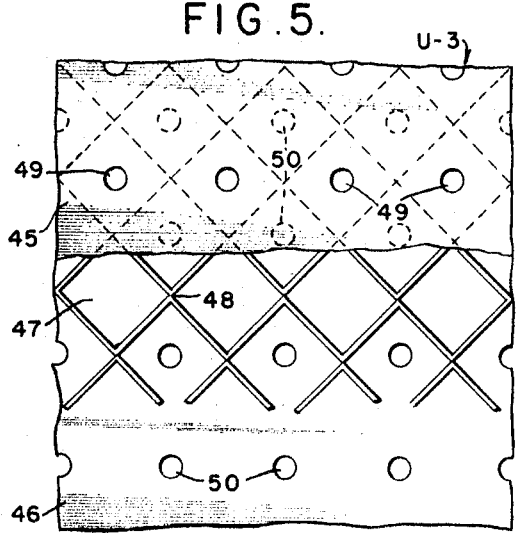
FIG. 5 is a view in perspective with parts broken away, of a form in which the cells are parallelograms with edge contact between the same.

FIG. 5 illustrates a further embodiment of the invention showing a similar arrangement of cells where the cells formed are essentialy parallelograms rather than hexagons. This unit is generally designated U–3 and as in the other forms, comprises the spaces sheets or walls 45 and 46 between which are located the filtering cells each of which is generally designated 47. In this construction the cells which, as stated, are essentially parallelograms, comprise individual strips of material bent or folded into a substantially corrugated form and arranged in parallel relation with the corners of the folds of one strip engaging or abutting the corners of folds of an adjacent strip so that the contact between the cells is reduced to a line as at 48. This construction allows for a somewhat higher percentage of usable filter area and the contacting edges of the parts at the lines 48 can either be glued or left unglued, as found desirable.

The sheet 45 is provided with transverse rows of inlet apertures 49 which communicate with corresponding rows of cells and the rows of cells with which the apertures 49 communicate alternate with rows which communicate with outlet apertures 50 formed in the bottom walls or sheet 46.

Figure 6:
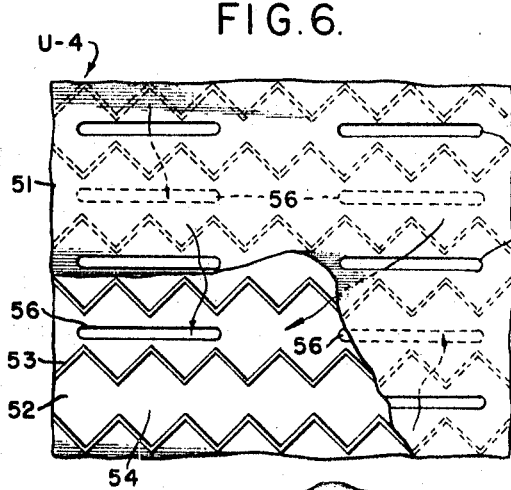
FIG. 6 is a view in top plan of another form of the filtering unit with a portion of the top wall broken away and illustrating an arrangement where the filter paper medium forming the honeycomb-like filtering area does not have contact between the strips.

FIG. 6 illustrates an arrangement somewhat similar to that shown in FIG. 5, which unit being generally designated U-4, wherein the walls or sheets which are designated 51 and 52 are maintained separated or in spaced relation by folded or corrugated strips 53 of filtering paper, formed similarly to the strips shown in FIG. 5 and by the use of which the cells 47 are produced. These corrugated strips 53 are in spaced parallel relation rather than having the edges of the corrugations joined together as in FIG. 5 whereby the cells are elongated in a line parallel with the sheets or walls 51 and 52 forming the fluid receiving chambers 54. The sheet 51 is here illustrated as having admission apertures 55 which are in the form of slots paralleling the long filtering areas 54, but which, of course, may also be in the form of a series of apertures as in other embodiments, and these slots are in rows which enter filter areas 54 which alternate with areas which communicate with opposite apertures 56 formed through the wall sheet 52.

Figure 7:
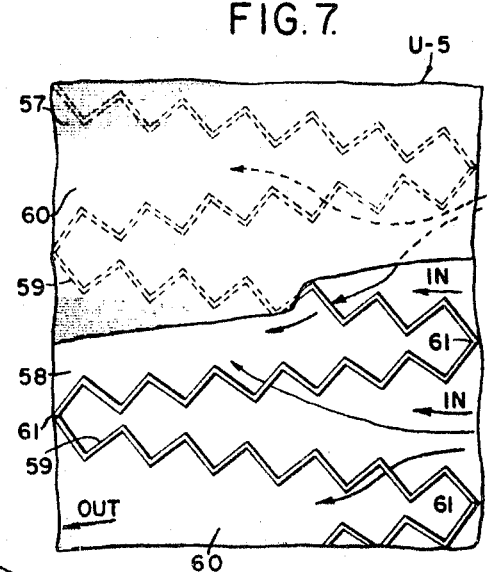
FIG. 7 illustrates still another form of the filtering unit, in top plan, with the top and bottom walls imperforate and the top wall partly broken away to show the form of the membrane strips between the walls and illustrating the path of fluid flow in parallel with the top and bottom walls rather than through the same as in preceding forms.

FIG. 7 illustrates another embodiment of the invention wherein the illustrated unit is generally designated U-5 and which unit is formed to convey the fluid in paths paralleling the spaced or top and bottom walls or sheets which are designated 57 and 58.

In this construction the lines of honeycomb cells 59 are formed by the provision of corrugated strips similar to those used in the structures shown in FIGS. 5 and 6, arranged in alternately convergent relationship to form the tapered cell areas 60. The edges of the corrugations of the strips do not touch but the ends of the strips where they converge are sealed together as at 61. The air or other fluid admission to this embodiment of the filter structure is from one side of the structure to the other rather than transversely through the opposite sheets or walls 57 and 58 so that the wide ends of the longitudinal areas 60 at one side of the unit may form the fluid inlet and the wide ends of intermediate areas at the opposite side of the unit form the fluid outlet, the fluid, of course, passing from the inlets to the outlets obliquely through the filter paper material in an obvious manner.

Figure 8:
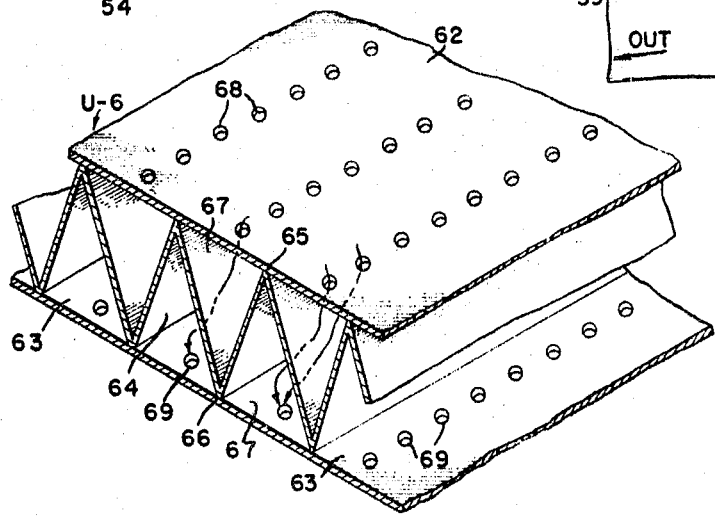
FIG. 8 is a view in perspective of still another embodiment of the invention wherein the filter paper medium between the top and bottom apertured walls of the unit is accordion pleated, the walls and intermediate filtering material being partially in section.

FIG. 8 illustrates a still further embodiment of the invention wherein the unit is generally designated U-6. In this form spaced parallel walls, which may be designated as top and bottom walls, are indicated by the reference characters 62 and 63 and these walls are maintained in spaced relation by an interposed sheet or body of filter paper material which is generally designated 64. The sheet 64 is folded to form V-shaped accordion pleats which have the alternate edges glued or secured in any other suitable manner, respectively, to the sheets 62 and 63, as indicated at 65 and 66 so that there are provided by the sheets 62 and 63 the V-shaped fluid passages or cells 67.

One of the sheets, here designated 62, is provided with suitable means for passing fluid therethrough into a series of parallel cells 67 which alternate with means in the opposite sheet for passing fluid from a series of other and alternate parallel cells through such opposite sheet, which is here designated 63. Such means is here illustrated as rows of apertures 68 in the first sheet 62 and corresponding rows of apertures 69 for discharging fluid from the said alternate cells through the opposite sheet. It is to be understood that while the apertures have been shown as round and in rows, any random opening or openings in the sheet 62 obviously will invariably communicate with one surface of the pleated material while any random opening or openings in the opposite sheet will invariably communicate with the opposite surface of the filter material and, therefore, the invention is not to be limited in any respect to the type of opening or openings employed.

Thus it will be seen that fluid entering either through the apertures 68 or the apertures 69 into the cells with which such apertures communicate, must pass through the convergent walls of the triangular shaped chambers into adjacent chambers to flow out through the apertures of the opposite wall.

The apparatus illustrated in FIG. 8 may be manufactured in a most simple and efficient manner and eliminates many expensive and time consuming steps required in the manufacture of similar prior art devices.

In making the arrangement shown in FIG. 8, the separate flat end wall portions 62 and 63 are provided with flat inner surfaces and are formed with the holes therein as aforedescribed.

The sheet 64 is a continuous integral one-piece sheet of filter paper material and is also fluid pervious. This sheet is repeatedly folded to provide accordion pleating wherein the pleats are substantially V-shaped in cross sectional configuration and wherein each of the pleats includes edge portions which are adapted to be placed in contact with the adjacent flat inner surfaces of the end wall portions.

After having formed member 64 into the configuration shown in FIG. 8, this member is placed between members 62 and 63 with a first plurality of alternate pleat edges in contact with the inner flat surface of one of the end wall portions and the other alternate pleat edges in contact with the inner flat surface of the other end wall portion. These edges are then secured to the associated flat inner surface by means of a suitable adhesive substance and the like, the member 64 being secured in operative position such that the holes in one end wall portion are in communication with alternate ones of the cells 67 while the holes in the other end wall portion are in communication with intervening alternate cells.

It should be particularly noted in this modification that the edge portions of the pleat are substantially straight and disposed in spaced parallel relationship with one another with a first plurality of alternate edges lying substantially in a first plane and a seocnd plurality of alternate edges lying substantially in a second plane, whereby insertion and mounting of the sheet 64 in operative position is faciliated.

It will further be noted that in each of the various modifications of the present invention, the process of manufacture is similar. In other words, two end wall portions with suitable holes are provided, each of these end wall portions having substantially flat inner facing surface.

In each modification, a core section is provided which is preformed and preassembled to define a plurality of chambers, or a honeycomb-like structure. In each modification the central core section also includes opposite edge portions which are adapted to contact the inner facing flat surfaces of the associated end wall portions and to be bonded thereto as by an adhesive substance and the like.

It will accordingly be apparent that the method of manufacture of each of the various modifications is quite similar as pointed out above, the central core section being preformed and then placed between the flat end wall portions and secured in operative position.

From the foregoing it will be seen that there is provided by the present invention, in its different embodiments, filtering units which provide an extremely high surface area of filtration per unit volume combined with lightness of construction and the design of any one of the units is such that the unit may be economically fabricated.

What is claimed is:

1. A filter unit for installation in a housing between central aligned inlet and outlet ports thereof, comprising a core section consisting of a single integral one-piece sheet of filter paper material accordion pleated to define a plurality of fold edges extending in substantially straight lines and parallel with one another, a pair of sheets of material having substantially flat inner surfaces, the accordion pleated core forming sheet being located between said pair of sheets and maintaining the pair of sheets in spaced parallel relation, alternate fold edges of the pleats at one side of the core, being bonded to the flat inner surface of one of the pair of sheets and the fold edges of the pleats at the opposite side of the core with which the first stated edges alternate engaging the flat inner side of the other one of the pair of sheets and being bonded thereto, the spaces between the pleats of the core body forming adjacent parallel fluid cells and each of said spaced sheets having a number of rows of apertures therethrough, the apertures of the rows of one of the spaced sheets opening into alternate ones of the parallel cells with the apertures of the rows of the other one of the spaced sheets opening into the intervening alternate parallel cells.

2. The method of making a filter comprising providing a pair of separate flat end wall portions comprising sheets of filter paper material and having flat inner faces, providing holes in each of said end wall portions, providing a continuous integral one-piece sheet of filter paper material which is fluid pervious, folding said sheet of filter paper material to provide a plurality of V-shaped pleats therein including alternate edges which are substantially straight and disposed in spaced parallel relationship to one another, placing said pleated sheet of filter paper material between said end wall portions with the first alternate pleat edges in contact with the flat inner surface of one of said end wall portions and bonding the alternate edges thereto and the remaining intervening alternate pleat edges in contact with the flat inner surface of the other end wall portion and bonding the intervening alternate edges thereto, to define a plurality of separate parallel cells, and with the holes in one end wall portion being in communication with alternate ones of said cells and the holes in the other end wall portion being in communication with intervening alternate cells.

3. The method as defined in claim 2 wherein said bonding is accomplished by adhesively securing said pleat edges to the associated flat inner surfaces of the end wall portions substantially along a line contact.

References Cited

UNITED STATES PATENTS

| | | | |
|---|---|---|---|
| 296,758 | 4/1884 | Kutsche | 55—484 |
| 446,218 | 2/1891 | Hallwood | 55—503 |
| 1,020,782 | 3/1912 | Tinker | 55—503 |
| 2,130,806 | 9/1938 | Link | 55—484 |
| 2,198,190 | 4/1940 | Vokes | 55—484 |
| 2,406,051 | 8/1946 | Weiss | 184—34 |
| 2,567,030 | 9/1951 | Schaaf | 55—489 |
| 2,749,265 | 6/1956 | Fricke et al. | 210—493 |

FOREIGN PATENTS

| | | |
|---|---|---|
| 191,348 | 12/1937 | Switzerland. |
| 348,158 | 5/1937 | Italy. |
| 401,287 | 10/1933 | Great Britain. |
| 539,269 | 9/1941 | Great Britain. |
| 565,265 | 11/1944 | Great Britain. |
| 683,132 | 10/1939 | Germany. |
| 781,864 | 8/1957 | Great Britain. |
| 1,111,568 | 11/1955 | France. |

OTHER REFERENCES

D19,582 III 5oe 11–56, Germany (Neumann).

HARRY B. THORNTON, Primary Examiner

BERNARD NOZICK, Assistant Examiner

U.S. Cl. X.R.

55—497, 500, 503, 514, 521; 156—210; 161—69, 113, 137; 210—493